(12) United States Patent
Rozensztejn et al.

(10) Patent No.: US 8,369,834 B2
(45) Date of Patent: Feb. 5, 2013

(54) USER DEVICE IDENTIFICATION USING A PSEUDO DEVICE IDENTIFIER

(75) Inventors: Diego S. Rozensztejn, Brighton, MA (US); Guillermo Ortiz, Woburn, MA (US); Okeno R. Palmer, Woburn, MA (US); Jack Jianxiu Hao, Lexington, MA (US); Michael R. Oliver, Wayne, NJ (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 321 days.

(21) Appl. No.: 12/889,632

(22) Filed: Sep. 24, 2010

(65) Prior Publication Data
US 2012/0077462 A1   Mar. 29, 2012

(51) Int. Cl.
*H04M 1/66* (2006.01)
(52) U.S. Cl. ............... 455/411; 455/410; 455/435.1
(58) Field of Classification Search .......... 455/410, 455/411, 414.3, 418–420, 435.1, 88; 709/216–219, 709/246; 725/62; 380/247–249; 713/169–171, 713/182, 185; 726/2–7, 16–19, 21, 26–29
See application file for complete search history.

(56) References Cited

U.S. PATENT DOCUMENTS

| | | | |
|---|---|---|---|
| 5,884,172 A * | 3/1999 | Sawyer | 455/435.1 |
| 7,444,148 B1 * | 10/2008 | Cook | 455/435.1 |
| 7,801,823 B2 * | 9/2010 | Maeda | 705/64 |
| 2002/0111179 A1 * | 8/2002 | Tanaka et al. | 455/517 |
| 2008/0046974 A1 * | 2/2008 | Minodier et al. | 726/4 |
| 2008/0057906 A1 * | 3/2008 | Lee et al. | 455/411 |

* cited by examiner

*Primary Examiner* — Wayne Cai
*Assistant Examiner* — Ronald Eisner

(57) ABSTRACT

A system configured to receive a first request to generate a pseudo identifier associated with a user device; retrieve an identifier associated with the user device; and generate, using a mathematical function, the pseudo identifier based on the identifier associated with the user device, where the pseudo identifier may be generated in a format corresponding to a telephone number. The system is further configured to send a second request to register the user device, where the second request may include the pseudo identifier; receive a confirmation code that permits the user device to access information, associated with the server device, without using the identifier associated with the user device or a telephone number associated with the user device; send a third request for information associated with the server device, where the third request may include the confirmation code; and receive the information associated with the server device.

22 Claims, 7 Drawing Sheets

USER DEVICE IDENTIFICATION USING A PSEUDO DEVICE IDENTIFIER

BACKGROUND

Computing and communication devices are capable of performing an increasing variety of functions and tasks that continue to improve the user's experience. Computing and communication devices can run a variety of applications, can connect to a variety of wired and wireless networks, can perform point of sale transactions to purchase goods and/or services, and/or can download content, which can be stored and/or displayed on the computing and communicating devices.

A computing and communication device may use a device identifier, such as a mobile directory number (MDN) and/or other information, when communicating with another device, which may enable the other device to identify and/or authenticate the computing and communication device. Unfortunately, the device identifier can be compromised in a manner that enables another computing and communication device to use the identifier without authorization.

DETAILED DESCRIPTION OF PREFERRED EMBODIMENTS

The following detailed description refers to the accompanying drawings. The same reference numbers in different drawings may identify the same or similar elements. Also, the following detailed description does not limit the invention.

Systems and/or methods described herein may enable a user device to communicate with another device using a pseudo device identifier. The pseudo device identifier may ensure that a device identifier, associated with the user device, cannot be used in an unauthorized manner. Also, some types and/or brands of user devices may enforce policies that do not permit certain identifiers to be used as identifying information (e.g., a mobile directory number (MDN)). In this case, the pseudo device identifier may permit a user device to provide identifying information while continuing to enforce the policies that do not permit certain identifiers to be used as identifying information.

A service provider network, associated with the user device, may use a device identifier (e.g., a MDN) and/or other information to identify and/or authenticate the user device before permitting the user device to access services associated with the service provider network. In one example implementation, a digital video recorder (DVR) mobile application (hereinafter referred to as a "mobile DVR application"), hosted on the user device, may use a mathematical function (e.g., a hash function, cryptographic function, and/or some other function) to generate a unique number that is based on a device identifier (e.g., serial number, etc.) uniquely associated with the user device. The mobile DVR application may perform an operation to convert the unique number into a unique pseudo device identifier (hereinafter referred to as a pseudo MDN) that is in a format of a telephone number (e.g., an MDN) which enables the service provider network to process the pseudo MDN.

In another example implementation, the mobile DVR application may use the pseudo MDN to associate a user device with another network device, such as a server device, a set top box (STB), etc. The association may permit the user device to access, monitor, and/or control information associated with the network device. In one example, the association may permit the user device to access and/or use DVR information (e.g., DVR recording schedules, playback schedules, parental control settings, search television content, etc.), associated with a STB, from a location that is remote from the STB. As described herein, the mobile DVR application may use the pseudo MDN to register the user device and/or to enable the user device to access the DVR information. The provisioning may include receiving a unique confirmation code (e.g., based on a mathematical function or some other function) associated with the set top box, which the user device may use to access the DVR information.

Figure 1:
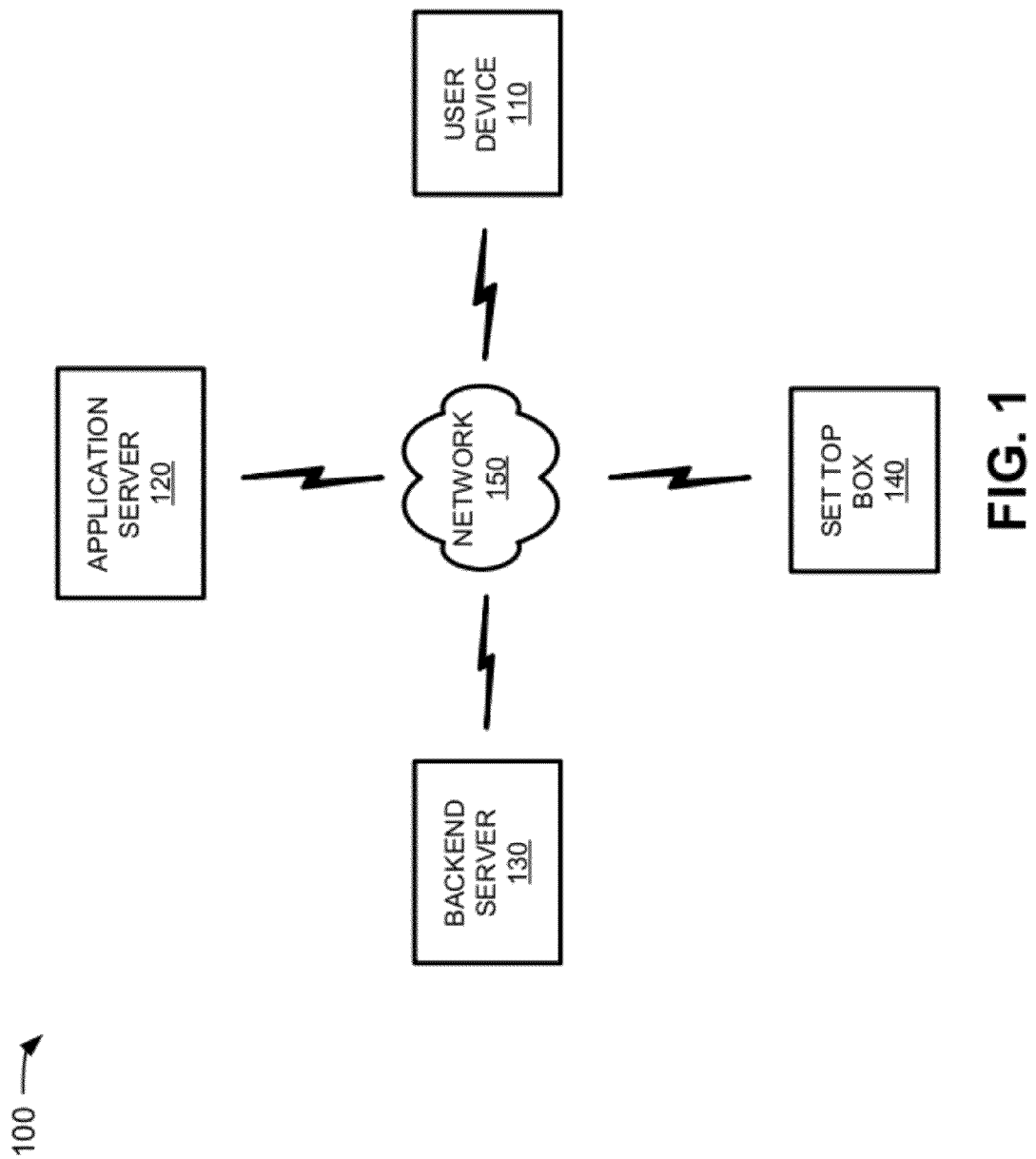
FIG. 1 is a diagram of an example network in which systems and/or methods described herein may be implemented.

FIG. 1 is a diagram of an example network 100 in which systems and/or methods described herein may be implemented. As shown in FIG. 1, network 100 may include a user device 110, an application server 120, a backend server 130, and/or a set top box (STB) 140 interconnected by a network 150. The number of devices and/or networks, illustrated in FIG. 1, is provided for explanatory purposes only. In practice, there may be additional networks and/or devices, fewer networks and/or devices, different networks and/or devices, or differently arranged networks and/or devices than illustrated in FIG. 1.

Also, in some implementations, one or more of the devices of network 100 may perform one or more functions described as being performed by another one or more of the devices of network 100. For example, application server 120 and backend server 130 may be integrated into a single device. Components of network 100 may interconnect via wired connections, wireless connections, or a combination of wired and wireless connections.

User device 110 may include any computation or communication device, such as a wireless mobile communication device, that is capable of communicating with network 150. For example, user device 110 may include a radiotelephone, a personal communications system (PCS) terminal (e.g., that may combine a cellular radiotelephone with data processing and data communications capabilities), a personal digital assistant (PDA) (e.g., that can include a radiotelephone, a pager, Internet/intranet access, etc.), a laptop computer, a personal computer, a camera, a personal gaming system, or another type of computation or communication device.

In one example implementation, user device 110 may host a mobile DVR application to monitor and control DVR information associated with set top box 140. For example, the mobile DVR application may perform an operation to create a pseudo MDN uniquely associated with user device 110. The mobile DVR application may, for example, retrieve a device identifier associated with user device 110 (e.g., a serial number associated with user device 110) and may use the device identifier to generate a unique number of a particular length (e.g., a particular quantity of digits) based on a mathematical function, such as a hash function (e.g., a Bernstein-based hash function or some other hash function), a cryptographic function (e.g., a secure hash algorithm (SHA))-based function or some other cryptographic function), or some other mathematical function.

The DVR application may use the generated number to create a unique pseudo MDN that is based on and/or compatible with a North American Numbering Plan (NANP) telephone number format, such as an area code (e.g., a three-digit number), an exchange code (e.g., a three-digit number), and/or a subscriber number (e.g., a four-digit number). However, the mobile DVR application may perform a conversion operation to ensure that the pseudo MDN is not the same as a telephone number or another pseudo MDN. Alternatively, or additionally, the DVR application may create the unique pseudo MDN based on another telephone number format (e.g., associated with another country, another standard, etc.).

User device 110 may perform a registration operation in order to communicate with other network devices. In one example implementation, user device 110 may perform a registration operation in order to access DVR information associated with STB 140. For example, the mobile DVR application may send a registration request to application server 120 that includes the pseudo MDN and/or other information associated with user device 110 and/or a user of user device 110. Application server 120 may process the request and may send a confirmation code, associated with STB 140, to user device 110 that enables user device 110 to access DVR information stored on STB 140.

The description to follow will generally refer to user device 110 as a wireless mobile communication device. The description is not limited, however, to a wireless mobile communication device and may equally apply to other types of user devices.

Application server 120 may include one or more server devices, or other types of computation or communication devices, that gather, process, search, store, and/or provide information in a manner similar to that described herein. Application server 120 may communicate via network 150. In one example, application server 120 may receive a registration request from user device 110 that includes a pseudo MDN associated with user device 110, and application server 120 may authenticate user device 110 based on information associated with user device 110 and/or information associated with a user of user device 110 (e.g., username, password, personal identification number (PIN), etc.). Application server 120 may store the pseudo MDN in a memory associated with application server 120 and may use the pseudo MDN, at a future point in time, to authenticate user device 110. Application server 120 may send the pseudo MDN to STB 140 and/or backend server 130. In an example implementation, application server 120 may register user device 110 by generating a confirmation code based on a device identifier associated with STB 140 and may send a notification to user device 110 (e.g., that includes the confirmation code) indicating that user device 110 has been registered. In another example implementation, application 120 may send the pseudo MDN to STB 140 that permits STB 140 to perform the registration.

Application server 120 may determine that a pseudo MDN, associated with user device 110, is not a unique pseudo MDN. For example, application server 120 may compare the received pseudo MDN to other pseudo MDNs stored in the memory. If the pseudo MDN matches one of the stored pseudo MDNs, application server 120 may send information associated with user device 110 to backend server 120 to obtain a unique pseudo MDN.

Application server 120 may synchronize DVR information between STB 140 and backend server 130. For example, user device 110 may communicate with STB 140, via application server 120, when accessing DVR information and may change DVR information stored by STB 140 (e.g., by scheduling television content playback or programming recording sessions, performing searches, etc.). Application server 120 may identify changes in the DVR information associated with the STB 140 and may send the changes in DVR information to backend server 130.

Backend server 130 may include one or more server devices, or other types of computation or communication devices, that gather, process, search, store, and/or provide information in a manner similar to that described herein. Backend server 130 may communicate via network 150. In one example implementation, backend server 130 may generate a pseudo MDN based on an instruction received from application server 120. For example, backend server 130 may receive an instruction from application server 120 to generate a unique pseudo MDN, associated with user device 110, based on a determination (e.g., by application server 120) that a pseudo MDN generated by user device 110 is not a unique pseudo MDN (e.g., there is another pseudo MDN that matches the pseudo MDN created by user device 110). In another example implementation, backend server 130 may receive a pseudo MDN associated with user device 110 and may determine, in a manner similar to that described above, that the received pseudo MDN is not unique.

Backend server 130 may create another pseudo MDN, in a manner similar to that described above and may generate a unique number based on a device identifier (e.g., a serial number, etc.) associated with user device 110. Backend server 130 may, for example, generate a unique number using on a mathematical function (e.g., a hash function, a cryptographic function, or some other mathematical function). Additionally, or alternatively, backend server 130 may use the generated number to create a unique pseudo MDN that corresponds to the NANP telephone number format.

The other pseudo MDN, created by backend server 130, may be different than the pseudo MDN created by user device 110. For example, backend server 130 may perform a modified conversion operation that converts the generated number into the other pseudo MDN that corresponds to the NANP format. Additionally, or alternatively, the modified conversion operation may ensure that the other pseudo MDN does not match a telephone number or another MDN. Backend server 130 may send the other pseudo MDN to user device 110, application server 120 and/or STB 140.

STB 140 may include a device that can receive and process an enhanced media stream, received from network 150, for display on a video display device associated with STB 140. In one example implementation, STB 140 may be incorporated directly within a video display device (e.g., a television, a monitor, etc.). In another example implementation, STB 140 may be replaced with a computing device (e.g., a personal computer, a laptop computer, a tablet computer, etc.), a cable card, a TV tuner card, or a portable communication device (e.g., a mobile telephone or a PDA). STB 140 may perform decoding and/or decryption functions on the enhanced media stream. STB 140 may present DVR information for display on a video display device associated with STB 140. STB 140 may store DVR information and may receive instructions associated with using, monitoring and/or controlling the DVR information. For example, STB 140 may receive an instruction, from a user of STB 140 and/or via a registered user device 110, to program a DVR application to record television content at a particular time. In another example, STB 140 may receive an instruction to schedule a time to playback recorded television content. In yet another example, STB 140 may receive an instruction to set parental controls, perform a search for additional DVR content, obtain on demand context, etc.

STB 140 may register user device 110 to access DVR information. For example, STB 140 may receive a registration request from user device 110, via application server 120, that includes a pseudo MDN associated with user device 110. STB 140 may store the pseudo MDN in a memory associated with STB 140 and may register user device 110 to access DVR information, stored on STB 140, by generating a confirmation code. For example, STB 140 may, in a manner similar to that described above, generate a unique number, based on a unique device identifier associated with STB 140 and using a mathematical function (e.g., a hash function, a cryptographic function, or some other mathematical function). Additionally, or alternatively, STB 140 may use the generated number to create a confirmation code that corresponds to the NANP telephone number format in a manner similar to that described above. STB 140 may send the confirmation code to user device 110, application server 120, and/or backend server 130.

STB 140 may permit user device 110 to access DVR information. For example, STB 140 may receive a request, from user device 110 and via application server 120, to access DVR information. The request may include credentials such as a confirmation code associated with STB 140 and/or a pseudo MDN associated with user device 110. STB 140 may authenticate user device 110 (e.g., if application server 120 did not authenticate user device 110) based on the credentials and/or may send DVR information to user device 110 via application server 120. Additionally, or alternatively, STB 140 may receive instructions to record television content, schedule playback times for television content, set parental controls, obtain on demand context, etc. and STB 140 may record the television content, schedule playback times for the television content, set the parental controls, obtain on demand context, etc.

Network 150 may include one or more wired and/or wireless networks. For example, network 150 may include a cellular network, a public land mobile network (PLMN), a second generation (2G) network, a third generation (3G) network, a fourth generation (4G) network (e.g., a long term evolution (LTE) network), a fifth generation (5G) network, and/or another network. Additionally, or alternatively, network 250 may include a wide area network (WAN), a metropolitan network (MAN), a telephone network (e.g., the Public Switched Telephone Network (PSTN)), an ad hoc network, an intranet, the Internet, a fiber optic-based network (e.g., a FiOS network), and/or a combination of these or other types of networks.

Although not shown in FIG. 1, network 100 may include a variety of other devices, such as a video display device, an authentication server, etc. Each of these devices may perform certain functions described briefly below. Any of these functions may be performed by application server 120, backup server 130, and/or STB 140. Thus, one or more of these devices may be integrated into application server 120, backup server 130, and/or STB 140.

A video display device may include any device capable of receiving and/or reproducing video and/or audio signals. In one implementation, the video display device may take the form of a television. In another implementation, the video display device may include a computer monitor, a display of a communication device (e.g., a telephone, such as a VoIP telephone or a mobile telephone, or a PDA), or the like. The video display device may incorporate and/or be connected to STB 140 and may receive signals from STB 140 containing television content and/or DVR information for display.

The authentication server may include one or more server devices, or other types of computation or communication devices, that authenticate user device 110 and/or STB 140. For example, the authentication server may receive a request to authenticate user device 110 based on information associated with user device 110 (e.g., a pseudo MDN), a confirmation code associated with STB 140, and/or information associated with a user of user device 110 (e.g., username, password, email address, PIN, etc.).

Figure 2:
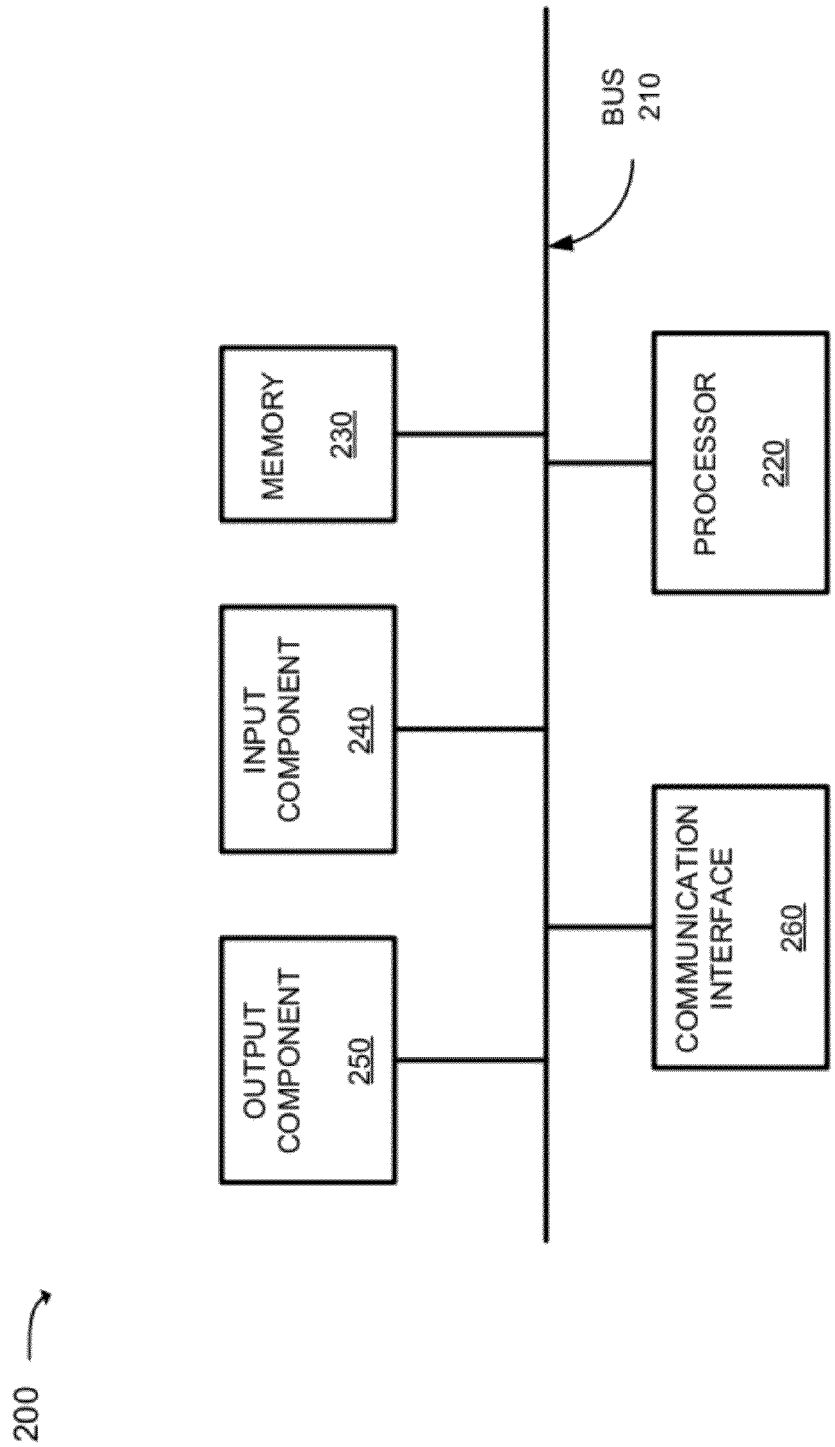
FIG. 2 is a diagram of example components of one or more of the devices of FIG. 1.

FIG. 2 is a diagram of example components of a device 200 that may correspond to application server 120, backend server 130, and/or STB 140. Device 200 may include a bus 210, a processor 220, a memory 230, an input component 240, an output component 250, and a communication interface 260. Although FIG. 2 shows example components of device 200, in other implementations, device 200 may include fewer components, additional components, different components, or differently arranged components than depicted in FIG. 2. Additionally, or alternatively, in other implementations, one or more components of device 200 may perform one or more tasks described as being performed by one or more other components of device 200.

Bus 210 may include a path that permits communication among the components of device 200. Processor 220 may include a processor, microprocessor, or processing logic that may interpret and execute instructions. Memory 230 may include any type of dynamic storage device that may store information and instructions for execution by processor 220, and/or any type of non-volatile storage device that may store information for use by processor 220.

Input component 240 may include a mechanism that permits a user to input information to device 200, such as a keyboard, a keypad, a button, a switch, etc. Output component 250 may include a mechanism that outputs information to the user, such as a display, a speaker, one or more light emitting diodes (LEDs), etc. Communication interface 260 may include any transceiver-like mechanism that enables device 200 to communicate with other devices and/or systems via wireless communications (e.g., radio frequency, infrared, and/or visual optics, etc.), wired communications (e.g., conductive wire, twisted pair cable, coaxial cable, transmission line, fiber optic cable, and/or waveguide, etc.) or a combination of wireless and wired communications. For example, communication interface 260 may include mechanisms for communicating with another device or system via a network, such as network 150.

Figure 3:
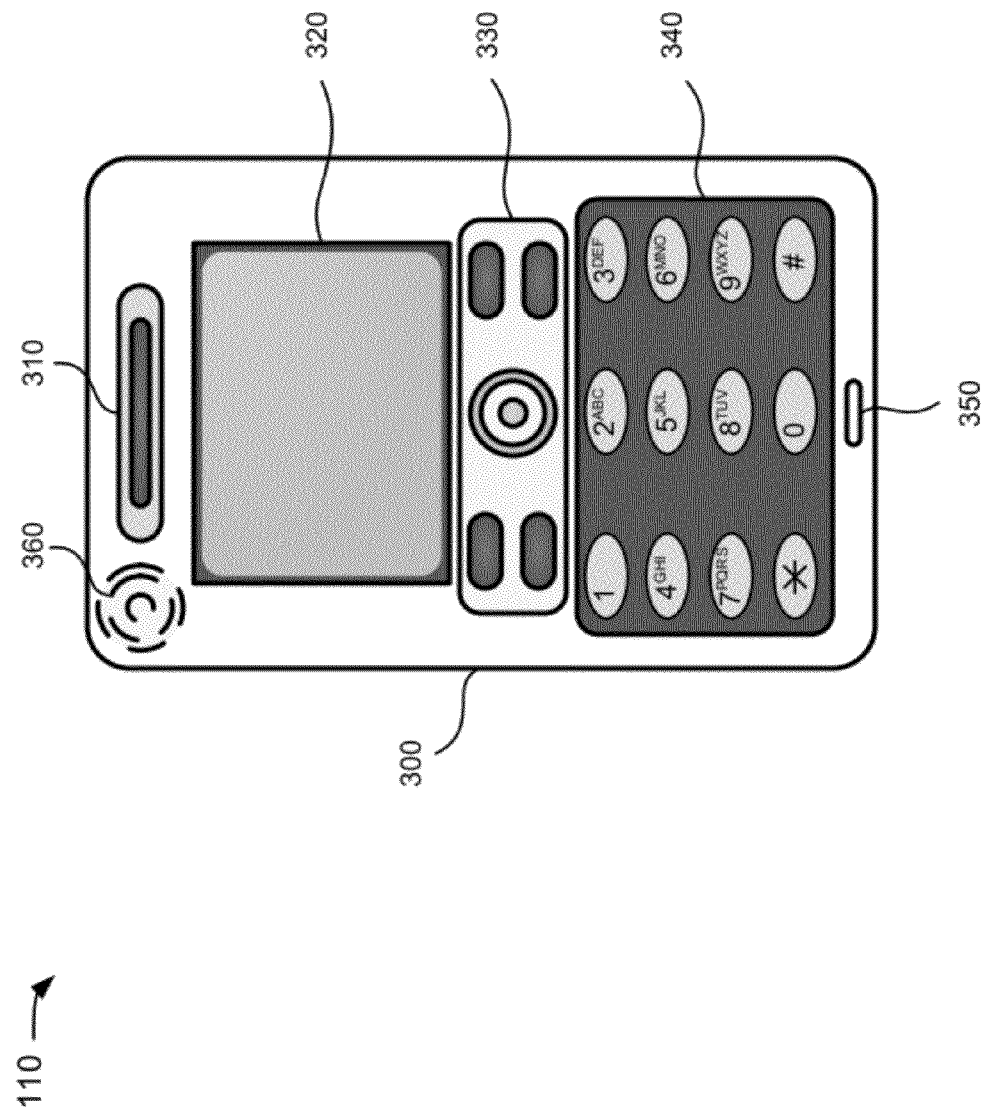
FIG. 3 is a diagram of an example user device, as shown in FIG. 1.

As will be described in detail below, device 200 may perform certain operations relating to user device identification using a pseudo device identifier. Device 200 may perform these operations in response to processor 220 executing software instructions contained in a computer-readable medium, such as memory 230. A computer-readable medium may be defined as a physical or logical memory device. A logical memory device may include memory space within a single physical memory device or spread across multiple physical memory devices. The software instructions may be read into memory 230 from another computer-readable medium or from another device. The software instructions contained in memory 230 may cause processor 220 to perform processes described herein. Alternatively, hardwired circuitry may be used in place of or in combination with software instructions to implement processes described herein. Thus, implementa- FIG. 3 is a diagram of an example user device 110. As shown in FIG. 3, user device 110 may include a housing 300, a speaker 310, a display 320, control buttons 330, a keypad 340, a microphone 350, and/or a camera 360. Housing 300 may include a chassis via which some or all of the components of user device 110 are mechanically secured and/or covered. Speaker 310 may include a component to receive input electrical signals from user device 110 and transmit audio output signals, which communicate audible information to a user of user device 110.

Display 320 may include a component to receive input electrical signals and present a visual output in the form of text, images, videos and/or combinations of text, images, and/or videos which communicate visual information to the user of user device 110. In one implementation, display 320 may display text input into user device 110, text, images, and/or video received from another device, and/or information regarding incoming or outgoing calls or text messages, emails, media, games, phone books, address books, the current time, etc.

Control buttons 330 may include one or more buttons that accept, as input, mechanical pressure from the user (e.g., the user presses a control button or combinations of control buttons) and send electrical signals to processor 220 that may cause user device 110 to perform one or more operations. For example, control buttons 330 may be used to cause user device 110 to transmit information. Keypad 340 may include a standard telephone keypad or another arrangement of keys.

Microphone 350 may include a component to receive audible information from the user and send, as output, an electrical signal that may be stored by user device 110, transmitted to another user device, or cause the device to perform one or more operations. Camera 360 may be provided on a back side of user device 110, and may include a component to receive, as input, analog optical signals and send, as output, a digital image or video that can be, for example, viewed on display 310, stored in the memory of user device 110, discarded and/or transmitted to another user device 110.

Although FIG. 3 depicts example components of user device 110, in other implementations, user device 110 may include fewer components, additional components, different components, or differently arranged components than illustrated in FIG. 3. In still other implementations, one or more components of user device 110 may perform one or more tasks described as being performed by one or more other components of user device 110.

Figure 4:
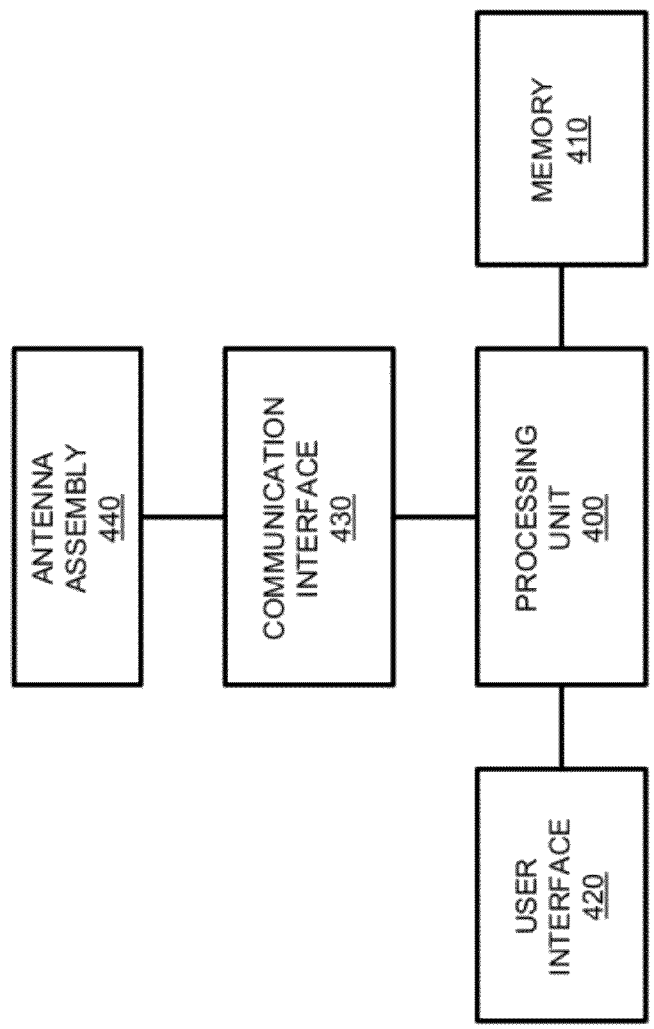
FIG. 4 is a diagram of example components of the user device of FIG. 3.

FIG. 4 is a diagram of example components of user device 110. As shown in FIG. 4, user device 110 may include a processing unit 400, a memory 410, a user interface 420, a communication interface 430, and/or an antenna assembly 440. Although FIG. 4 shows example components of user device 110, in other implementations, user device 110 may include fewer components, additional components, different components, or differently arranged components than depicted in FIG. 4. In still other implementations, one or more components of user device 110 may perform one or more tasks described as being performed by one or more other components of user device 110.

Processing unit 400 may include a processor, a microprocessor, an ASIC, a FPGA, or the like. Processing unit 400 may control operation of user device 110 and its components. In one implementation, processing unit 400 may control operation of components of user device 110 in a manner similar to that described herein. Memory 410 may include a RAM, a ROM, and/or another type of memory to store data and/or instructions that may be used by processing unit 400.

User interface 420 may include mechanisms for inputting information to user device 110 and/or for outputting information from user device 110. Examples of input and output mechanisms might include buttons (e.g., control buttons 330, keys of keypad 340, a keyboard, a joystick, etc.); a touch screen interface to permit data and control commands to be input into user device 110 via display 320; a biometric device to receive fingerprint scans, retinal scans, facial signatures, etc.; a speaker (e.g., speaker 310) to receive electrical signals and output audio signals; a microphone (e.g., microphone 350) to receive audio signals and output electrical signals; a display (e.g., display 320) to output visual information (e.g., user interfaces, web pages, etc.); a vibrator to cause user device 110 to vibrate; and/or a camera (e.g., camera 360) to receive video and/or images.

Communication interface 430 may include, for example, a transmitter that may convert baseband signals from processing unit 400 to radio frequency (RF) signals and/or a receiver that may convert RF signals to baseband signals. Alternatively, communication interface 430 may include a transceiver to perform functions of both a transmitter and a receiver of wireless communications (e.g., radio frequency, infrared, visual optics, etc.), wired communications (e.g., conductive wire, twisted pair cable, coaxial cable, transmission line, fiber optic cable, waveguide, etc.), or a combination of wireless and wired communications. Communication interface 430 may connect to antenna assembly 440 for transmission and/or reception of the RF signals.

Antenna assembly 440 may include one or more antennas to transmit and/or receive RF signals over the air. Antenna assembly 440 may, for example, receive RF signals from communication interface 430 and transmit them over the air, and receive RF signals over the air and provide them to communication interface 430. In one implementation, for example, communication interface 430 may communicate with a network and/or devices connected to a network (e.g., network 150).

As described in detail below, user device 110 may perform certain operations described herein in response to processing unit 400 executing software instructions of an application contained in a computer-readable medium, such as memory 410. The software instructions may be read into memory 410 from another computer-readable medium or from another device via communication interface 430. The software instructions contained in memory 410 may cause processing unit 400 to perform processes that will be described later. Alternatively, hardwired circuitry may be used in place of or in combination with software instructions to implement processes described herein. Thus, implementations described herein are not limited to any specific combination of hardware circuitry and software.

Figure 5:
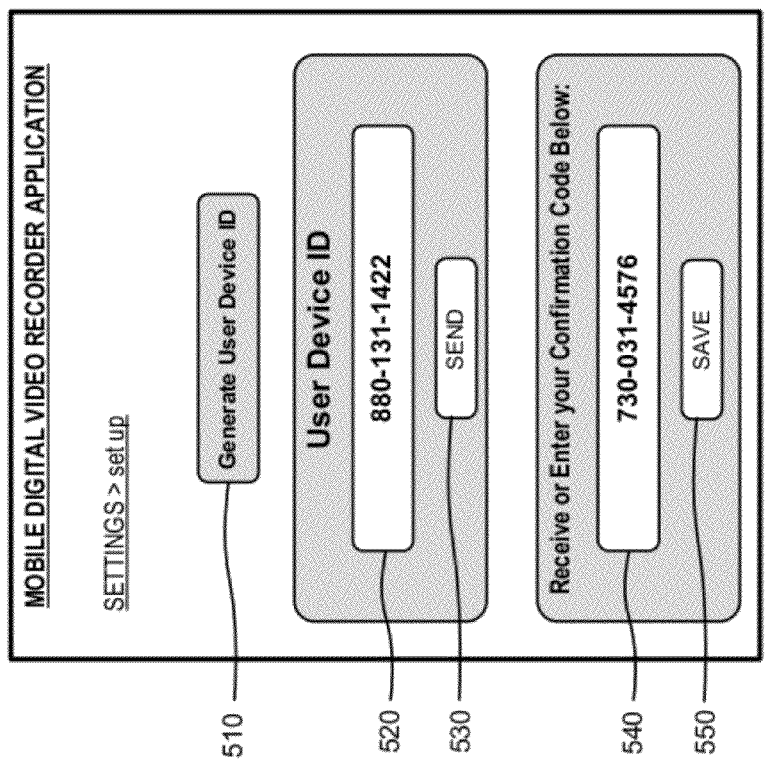
FIG. 5 is a diagram of an example pseudo device identifier set up user interface that is capable of being presented on the user device of FIG. 1.

FIG. 5 is a diagram of an example pseudo device identifier set up user interface (UI) 500 (hereinafter referred to as "set up UI 500") that is capable of being presented on user device 110. Set up UI 500 may be presented on user device 110, by the mobile DVR application, when, for example, a user (e.g., a user of user device 110) selects a button or series of buttons on user device 110 to open the mobile DVR application and/or to navigate through other UIs, associated with the mobile DVR application (e.g., a main menu, a settings menu, etc.), in order to reach set up UI 500. As shown in FIG. 5, set up UI 500 may include a collection of fields and/or buttons, such as a generate user device identifier (ID) button 510 (hereinafter referred to as a "generate ID button 510"), a user device identifier (ID) field 520, a send button 530, a confirmation code field 540, and a save button 550. Set up UI 500, of FIG. 5, includes fields and/or buttons 510-550 for explanatory purposes. In practice, set up UI 500 may include additional fields and/or buttons, fewer fields and/or buttons, different fields and/or buttons, and/or differently arranged fields and/or buttons than are described with respect to set up UI 500.

Generate ID button 510 may permit the user to instruct user device 110 to generate a pseudo MDN that user device 110 may use to communicate with a network device (e.g., application server 120, STB 140, and/or another network device). User device ID field 520 may present a pseudo MDN, associated with user device 110, as a result of the instruction to generate the pseudo MDN (e.g., when the user selected generate ID button 510). Send button 530 may permit the user to send the pseudo MDN to another network device to register user device 110, using the pseudo MDN, that enables user device 110 to communicate with the other network device. Confirmation code field 540 may present a confirmation code, received from the other network device, as a result of registering user device 110 based on the pseudo MDN. In another example implementation, the confirmation code may be received from the other network device via a different channel (e.g., via the mail, via telephone, via email, via a video display associated with STB 140, etc.). In this example, the user may enter the confirmation code, received via the different channel, into confirmation code field 540. Save button 550 may permit the confirmation code and/or the pseudo MDN to be stored in a memory associated with user device 110.

For example, the user may select generate ID button 510, which may cause the mobile DVR application to retrieve a device identifier uniquely associated with user device 110 (e.g., a serial number associated with user device 110). The device identifier may be retrieved by the DVR application (e.g., using an API) in a manner that does not permit the device identifier to be accessed, modified, and/or copied by a user. In one example implementation, the serial number, associated with user device 110, may be of a particular length or quantity of digits depending on a type and/or brand of user device 110 (e.g., a serial number of an iPhone® may be a length of 40 digits). The mobile DVR application may use the serial number to generate a unique number based on a mathematical function, such as a hash function (e.g., a Bernstein hash function, or some other hash function), a cryptographic function (e.g., a secure hash algorithm (SHA) or some other cryptographic function), or some other mathematical function. In one example implementation, the generated number may be a nine-digit number. In another implementation, the generated number may be a number other than a nine-digit number.

The mobile DVR application may perform a conversion operation on the generated number to create a unique pseudo MDN. In one example, the conversion operation may create the pseudo MDN as a 10-digit number based on a North American Numbering Plan (NANP) telephone number format, such as an area code (e.g., a three-digit number), an exchange code (e.g., a three-digit number), and/or a subscriber number (e.g., a four-digit number). More particularly, a NANP-based telephone number may be based on a particular format, such as: XY#-Z##-####, where # is a whole number in the range from 0 to 9; X is a whole number in the range from 2 to 9; Y is a whole number in the range from 0 to 8; and/or Z is whole number in the range from 2 to 9. However, to ensure that a pseudo MDN does not overlap an actual telephone number being used by any user devices 110, the mobile DVR application may perform the conversion operation by setting a number, corresponding to the Z-position, to a value other than two through nine (e.g., such as 0 or 1). In another example implementation, the DVR application may perform the conversion operation in a manner that includes setting a number, corresponding to the X position, to a value other than two through nine. In yet another example implementation, the DVR application may perform the conversion operation in a manner that includes setting a number, corresponding to the Y position, to a value other than zero through eight.

In one example, the mobile DVR application may create the pseudo MDN by inserting a "1" into the generated number at a location that corresponds to the Z-position (e.g., the fourth position) with respect to the NANP format described above. Inserting the "1" into the generated number, may convert the generated number into a ten-digit pseudo MDN that corresponds to the NANP format. Additionally, or alternatively, by inserting the "1" in the Z-position, the mobile DVR application may ensure that the pseudo MDN does not overlap another telephone number because the NANP format restricts the Z-position of an NANP telephone number to a range between 2 and 9. The mobile DVR application may present the pseudo MDN for display (e.g., 880-131-1422) via user device ID field 520 (e.g., and/or may send the pseudo MDN to backend server 130 via application server 120 to verify that the pseudo MDN is unique.

In another example, another pseudo MDN may be received from backend server 130 based on a determination that the pseudo MDN is not unique. For example, backend server 130 may generate the other pseudo MDN using a modified conversion operation. For example, backend server may perform the modified conversion operation by inserting a "0" into the generated number (e.g., instead of the "1" that the mobile DVR application inserted) at the location that corresponds to the Z-position (e.g., the fourth position) with respect to the NANP format. Inserting the "0" into the generated number may convert the generated number into the other ten-digit pseudo MDN that corresponds to the NANP format. Additionally, or alternatively, by inserting the "0" in the Z-position, backend server 130 may ensure that the other pseudo MDN does not match a telephone number or another MDN because the NANP format restricts the Z-position of an NANP telephone number to a range between 2 and 9. Backend server 130 may send the other pseudo MDN to user device 110, via application server 120, and the mobile DVR application may present the other pseudo MDN for display (e.g., 730-031-4576) via user device ID field 520.

In yet another example, the user may select send button 530 to register user device 110 to another device based on the pseudo MDN (e.g., or the other pseudo MDN). For example, user device 110 may send a registration request (e.g., that includes the pseudo MDN, other information associated with user device 110, and/or information associated with the user) to STB 140 via application server 120. STB 140 may receive the registration request and may register user device 110 that permits DVR information, stored on STB 140, to be accessed by device application 110 based on the pseudo MDN. For example, STB 140 may, in a manner similar to that described above, generate a unique number (e.g., a 9-digit number, such as 730314576), based on a unique device identifier associated with STB 140 (e.g., using a hash function, a cryptographic function, or some other mathematical function). Additionally, or alternatively, STB 140 may use the generated number to create a confirmation code based on the NANP telephone number format (e.g., XY#-Z##-####, where # is a whole number in a range from 0 to 9; X is a whole number in the range from 2 to 9; Y is a whole number in the range from 0 to 8; and/or Z is whole number in the range from 2 to 9). More particularly, STB 140 may insert a "0" or "1" into the generated number at a location that corresponds to the Z-position (e.g., the fourth position) with respect to the NANP format described above. Inserting the "0" or "1" into the generated number, may convert the generated number into a ten-digit confirmation code (e.g., 730-Z31-4576 becomes 730-031-4576, where Z=0) that corresponds to the NANP format. STB 140 may send the confirmation number to user device 110 and the mobile DVR application may present the confirmation number for display via confirmation code field 540. The user may save the confirmation code by selecting save button 550. In another example implementation, STB 140 may present the confirmation code to a video display associated with STB 140 and the user may enter the confirmation code, presented on the video display, into the confirmation code field 540 (e.g., using keypad 340 associated with user device 110).

Figure 6:
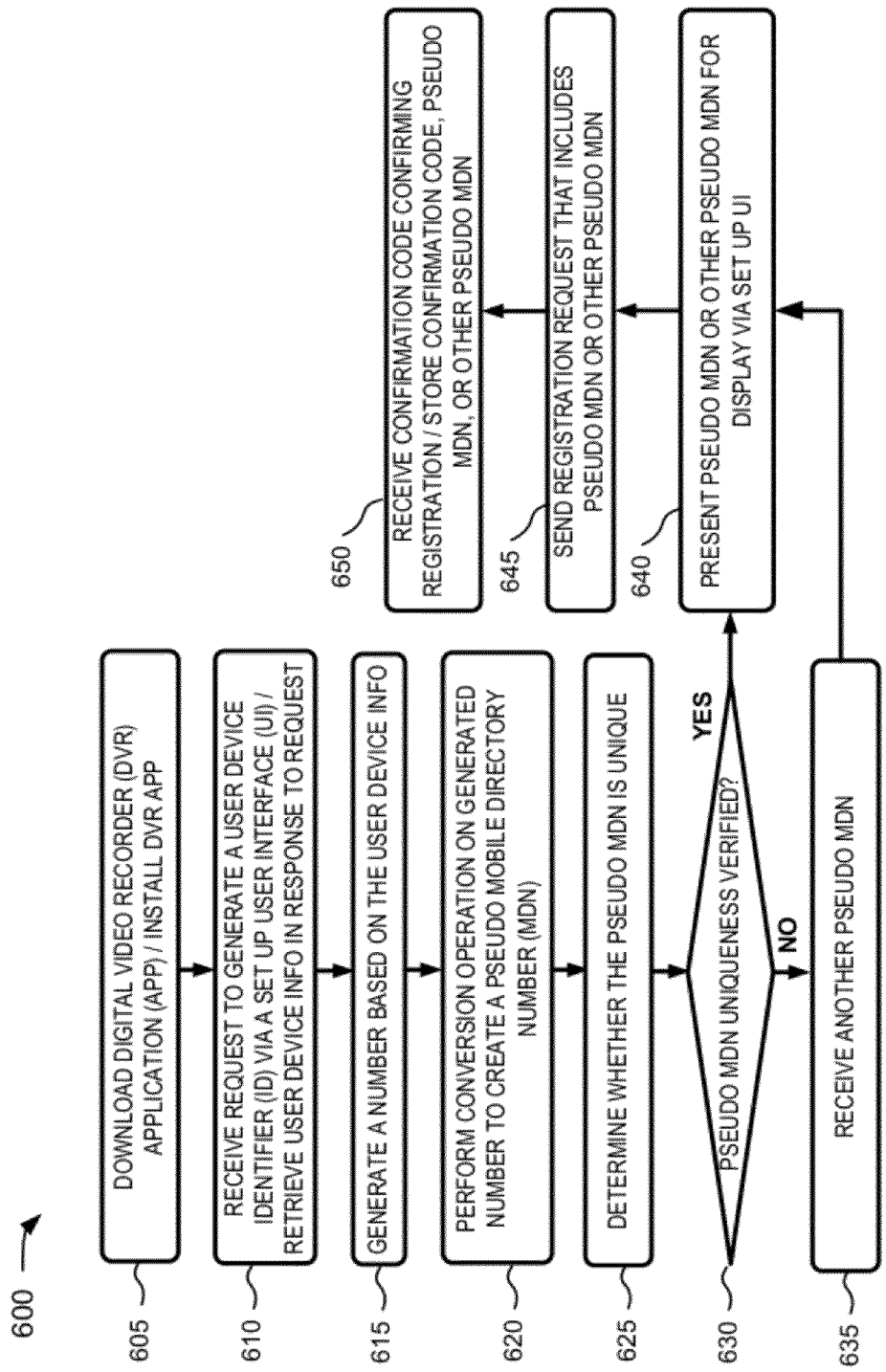
FIG. 6 is a flow chart of an example process for registering a user device using a pseudo device identifier.

FIG. 6 is a flow chart of an example process 600 for registering user device 110 using a pseudo device identifier. In one implementation, process 600 may be performed by user device 110 and/or STB 140. In another implementation, some or all of process 600 may be performed by a device or collection of devices separate from, or in combination with, user device 110 and/or STB 140.

As shown in FIG. 6, process 600 may include downloading a mobile DVR application and installing the mobile DVR application (block 605). For example, a user, of user device 110, may desire to access DVR information (e.g., programmed television content recording schedules, parental controls, etc.) and/or to modify DVR information (e.g., scheduling television content to be recorded, to set up a television playback, to perform searches for television content, update parental controls, etc.). The user may, for example, instruct user device 110 to download a mobile DVR application from application server 120 and/or some other network device. User device 110 may, in response to the instruction, send a request to application server 120 to download the mobile DVR application. Application server 120 may receive the request and may send the mobile DVR application to user device 110.

User device 110 may receive the mobile DVR application and may store the mobile DVR application in a memory associated with user device 110. Additionally, or alternatively, user device 110 may automatically present a set up UI (e.g., set up UI 500 of FIG. 5) for display on user device 110. In another example implementation, user device 110 may present the set up UI as a result of the user pressing a button, or series of buttons, on user device 110 in order to open mobile DVR application and/or to navigate to the set up UI.

As also shown in FIG. 6, process 600 may include receiving a request to generate a user device identifier via a set up UI and retrieving information associated with user device 110 in response to the request (block 610). For example, user device 110 may receive a request to set up a user device identifier when the user selects a particular button (e.g., generate ID button 510 of FIG. 5) on the set up UI (e.g., set up UI 500 of FIG. 5). The mobile DVR application may, in response to the request, retrieve information associated with user device 110. In one example implementation, the mobile DVR application may use an API or a set of APIs to communicate with user device 110 to obtain the information associated with user device 110 in a manner that does not permit the information associated with user device 110 to be accessed, copied, and/or changed by a user. For example, the mobile DVR application may use an OEM API, associated with a type and/or brand of user device 110, to obtain, from user device 110, the information associated with user device 110. The information associated with user device 110 may include a unique address associated with user device 110 (e.g., a MAC address, an IP address, etc.) and/or a unique device identifier (e.g., a serial number, a MEID, an IMEI, an MDN, an IMSI, an ESN, a UICC identifier, a MIN, a MSISDN, a NAI, a CODEC number, etc.).

As further shown in FIG. 6, process 600 may include generating a number based on information associated with user device 110 (block 615). For example, the mobile DVR application may, in a manner similar to that described above (e.g., with respect to FIG. 5) generate a number based on the information associated with user device 110. In one example, the number may include a particular length (e.g., a particular quantity of digits) and/or may be generated based on a device identifier (e.g., serial number, etc.), associated with user device 110. In another example, the number may be generated using a mathematical function (e.g., a hash function, a cryptographic function, and/or some other mathematical function). In one example implementation, the generated number may be a nine-digit number (e.g., 880311422) that the mobile DVR application may use to convert to a pseudo MDN associated with user device 110. If, in this example, the generated number has less than nine digits, then the mobile DVR application may insert a quantity of digits (e.g., a quantity of zeros) that may cause the generated number to be nine-digits.

As yet further shown in FIG. 6, process 600 may include performing a conversion operation on the generated number to create a pseudo MDN (block 620). For example, the mobile DVR application may, in a manner similar to that described above (e.g., with respect to FIG. 5), perform a conversion operation on the generated number to create a pseudo MDN that corresponds to the NANP telephone number format (e.g., a 10-digit number). Converting the generated number to a pseudo MDN, (e.g., a pseudo MDN that conforms to the NANP telephone number format) permits a service provider network (e.g., network 150) to process the pseudo MDN in a manner similar to that in which an MDN is processed.

In one example, the conversion operation may create a NANP-based pseudo MDN according to the format: XY#-Z##-####, where # is a whole number in the range from 0 to 9; X is a whole number in the range from 2 to 9; Y is a whole number in the range from 0 to 8; and/or Z is whole number in the range from 2 to 9. The mobile DVR application may perform the conversion operation by converting the generate number to a 10-digit number by inserting Z into a fourth position of the generated number (e.g., 880-Z31-1422, where X=8, Y=8, Z is in the fourth position). Additionally, or alternatively, the mobile DVR application may set a number, corresponding to the Z-position, to a value other than two through nine (e.g., 880-Z31-1422 becomes 880-131-1422, when Z is set to 1) to create the pseudo MDN associated with user device 110. In another example implementation, the DVR application may perform the conversion operation in a manner that includes setting a number, corresponding to the X position, to a value other than two through nine. In yet another example implementation, the DVR application may perform the conversion operation in a manner that includes setting a number, corresponding to the Y position, to a value other than zero through eight.

As shown in FIG. 6, process 600 may include determining whether the pseudo MDN is unique (block 625). For example, user device 110 may send the pseudo MDN to application server 120 to determine whether the pseudo MDN is unique. Application server 120 may receive the pseudo MDN and may compare the received pseudo MDN to other pseudo MDNs that are stored in a memory associated with application server 120 to determine whether the received pseudo MDN matches any of the stored pseudo MDNs.

As also shown in FIG. 6, if the uniqueness of a pseudo MDN cannot be verified (block 630—NO), then process 600 may include receiving another pseudo MDN (block 635). For example, application server 120 may determine that the pseudo MDN matches another pseudo MDN stored in a memory associated with application server 120. Based on this determination, application server 120 may send, to backend server 130, an instruction to generate another pseudo MDN associated with user device 110. The instruction may include the pseudo MDN and/or other information associated with user device 110 (e.g., a device identifier, etc.) and/or information associated with the user of user device 110.

Backend server 130 may receive the instruction and may, in a manner similar to that described above (e.g., with respect to FIG. 5), generate the other pseudo MDN using a modified conversion operation. For example, backend server 130 may generate a number, based on information associated with user device 110 (e.g., a device identifier, such as a serial number, etc.), using a mathematical function (e.g., the hash function, the cryptographic function, and/or another mathematical function). Backend server 130 may perform the modified conversion operation by inserting a different number (e.g., "0"), than the number inserted by user device 110 (e.g., "1"), into the generated number at the location that corresponds to the Z-position (e.g., the fourth position) with respect to the NANP format. By inserting the "0" in the Z-position, backend server 130 may ensure that the other pseudo MDN does not match a pseudo MDN, a telephone number, and/or another MDN because the NANP format restricts the Z-position of an NANP telephone number to a range between 2 and 9. Backend server 130 may send the other pseudo MDN to user device 110, via application server 120, and user device 110 may receive the other pseudo MDN.

As further shown in FIG. 6, if the uniqueness of a pseudo MDN is verified (block 630—YES), or another pseudo MDN is received (block 635), then process 600 may include presenting the pseudo MDN or the other pseudo MDN for display via a set up UI (block 640). For example, application server 120 may determine that the pseudo MDN does not match any of the stored pseudo MDNs and may store the pseudo MDN in a memory associated with application server 120. Additionally, application server 120 may send a notification to user device 110 that verifies that the pseudo MDN is unique. Based on the determination that the pseudo MDN is unique or based on the receipt of the other pseudo MDN, the mobile DVR application may present the pseudo MDN or the other pseudo MDN for display on user device 110 via the set up UI (e.g., set up UI 500 of FIG. 5).

As yet further shown in FIG. 6, process 600 may include sending a registration request that includes the pseudo MDN or the other pseudo MDN (block 645). For example, user device 110 may receive a request to register user device 110 when the user presses a particular button (e.g., send button 530 on set up UI 500 of FIG. 5). The mobile DVR application may, in response to the registration request, send a request to register user device 110 to application server 120. The request may include the pseudo MDN (or the other pseudo MDN), information associated with user device 110, and/or information associated with the user.

Application server 120 may authenticate user device 110 based on the pseudo MDN stored in a memory associated with application server 120. Additionally, or alternatively, application server 120 may authenticate user device 110 based on information associated with user device 110 and/or information associated with the user (e.g., username, password, PIN, etc.). Based on the authentication, application server 120 may send the pseudo MDN (or the other pseudo MDN) to STB 140. STB 140 may receive the pseudo MDN (or the other pseudo MDN) and STB 140 may generate a confirmation code.

As still further shown in FIG. 6, process 600 may include receiving a confirmation code confirming registration and storing the confirmation code, the pseudo MDN, and/or the other pseudo MDN (block 650). For example, STB 140 may receive the pseudo MDN (e.g., or the other pseudo MDN) and may generate a confirmation code based on an identifier associated with STB 140. STB 140 may, for example, use a mathematical function (e.g., a hash function, a cryptographic function, and/or another mathematical function) to generate a number. The mathematical function may be the same mathematical function as that used by the mobile DVR application or a different mathematical function than that used by the mobile DVR application. In one implementation, the generated number may be a nine-digit number. In one example, if the generated number is less than nine digits, the STB 140 may insert a quantity of digits (e.g., a quantity of zeros) that causes the generated number to be nine digits.

STB 140 may, in a manner similar to that described above (e.g., with respect to FIG. 5), use the generated number to create a confirmation code that corresponds to the NANP telephone number format. More particularly, STB 140 may insert a "0" or "1" into the generated number at a location that corresponds to the Z-position (e.g., the fourth position) with respect to the NANP format described above. In another example implementation, STB 140 may perform the conversion operation in a manner that includes setting a number, corresponding to the X position, to a value other than two through nine. In yet another example implementation, STB 140 may perform the conversion operation in a manner that includes setting a number, corresponding to the Y position, to a value other than zero through eight.

In another example implementation, application server 120 may generate the confirmation code and may send the confirmation code to STB 140. In yet another example implementation, application server 120 may instruct backend server 130 to generate the confirmation code and backend server 130 may send the confirmation code to STB 140 via application server 120.

STB 140 may store the confirmation code and/or may send the confirmation code to user device 110. User device 110 may receive the confirmation code and the mobile DVR application may present the confirmation code for display on a set up UI (e.g., via set up UI 500 of FIG. 5). User device 110 may save the confirmation code, the pseudo MDN, and/or the other pseudo MDN by selecting a particular button on the set up UI (e.g., save button 550 of FIG. 5).

In one example implementation, the mobile DVR application may encrypt the confirmation code, the pseudo MDN, and/or the other pseudo MDN prior to storing in the memory. The encrypting may prevent the confirmation code, the pseudo MDN, and/or the other pseudo MDN from being accessed, changed, and/or copied by an unauthorized user device 110 and/or a network device.

In another example implementation, STB 140 may present the confirmation code to a video display associated with STB 140 and the user may enter the confirmation code, presented on the video display, into the confirmation code field 540 (e.g., using keypad 340 associated with user device 110) to be stored on user device 110.

Figure 7:
FIG. 7 is a flow chart of an example process for using a pseudo device identifier to enable a user device to communicate with another network device.

FIG. 7 is a flow chart of an example process 700 for using a pseudo device identifier to enable user device 110 to communicate with another network device. In one implementation, process 700 may be performed by user device 110 and/or STB 140. In another implementation, some or all of process

700 may be performed by a device or collection of devices separate from, or in combination with, user device 110 and/or STB 140.

As shown in FIG. 7, process 700 may include receiving a request to access DVR information (block 705) and sending, in response to the request, a pseudo MDN and/or a confirmation code (block 710). For example, a user of user device 110 may send a request to access DVR information stored on STB 140 by pressing a particular button on user device 110 and/or by selecting a particular button on a DVR UI presented on user device 110. The mobile DVR application may receive the request and may retrieve, from a memory associated with user device 110, a pseudo MDN and/or a confirmation code.

The mobile DVR application may send a request to access DVR information to application server 120. The request may include the pseudo MDN and/or the confirmation code. Application server 120 may receive the request and may authenticate user device 110 based on the pseudo MDN. For example, application server 120 may compare the received pseudo MDN to pseudo MDNs stored in a memory (e.g., a memory associated with application server 120) to determine whether the received pseudo MDN matches a pseudo MDN stored in the memory. In one example, application server 120 may not authenticate user device 110 if the pseudo MDN does not match any of the pseudo MDNs stored in the memory. Application server 120 may send a notification to user device 110 indicating that access to the DVR information is not authorized based on the determination that user device 110 could not be authenticated.

In another example, application server 120 may authenticate user device 110 if the pseudo MDN matches one or the pseudo MDNs stored in the memory. Application server 120 may send the confirmation code to STB 140 based on the determination that user device 110 has been authenticated. STB 140 may receive the confirmation code and may compare the confirmation code to a confirmation code stored in memory. Based on a determination that the received confirmation code matches the stored confirmation code, STB 140 may retrieve DVR information and may send the DVR information to user device 110, via application server 120.

In another example implementation, the request to access DVR information may include the confirmation code and application server 120 and/or STB 140 may authenticate user device 110 based on the confirmation code.

As further shown in FIG. 7, process 700 may include receiving DVR information and presenting the DVR information for display (block 715). User device 110 may receive the DVR information and may present, via a DVR UI, the DVR information on a display associated with user device 110. The user may use the mobile DVR application to view the DVR information via the DVR UI.

As yet further shown in FIG. 7, process 700 may include receiving instructions via a DVR UI and sending the instructions associated with DVR information (block 720). The user may perform operations on the DVR information via the DVR UI. For example, the user may schedule DVR recordings of television content, may set and/or update parental controls, delete DVR information, perform searches for television content from which DVR recordings may be scheduled, etc. The user may perform an operation on the DVR information by pressing a particular button on user device 110 and/or by selecting a particular button on the DVR UI, which may cause user device 110 to send an instruction to STB 140 via application server 120. The instruction may include the pseudo MDN and/or the confirmation code. Application server 120 may authenticate user device 110 in the manner described above and/or STB 140 may perform operations in response to the instructions based on the confirmation code.

The foregoing description provides illustration and description, but is not intended to be exhaustive or to limit the invention to the precise form disclosed. Modifications and variations are possible in light of the above teachings or may be acquired from practice of the invention.

While series of blocks have been described with regard to FIGS. 6 and 7, the order of the blocks may be modified in other implementations. Further, non-dependent blocks may be performed in parallel.

It will be apparent that systems and methods, as described above, may be implemented in many different forms of software, firmware, and hardware in the implementations illustrated in the figures. The actual software code or specialized control hardware used to implement these systems and methods is not limiting of the invention. Thus, the operation and behavior of the systems and methods were described without reference to the specific software code—it being understood that software and control hardware can be designed to implement the systems and methods based on the description herein.

Further, certain portions, described above, may be implemented as a component that performs one or more functions. A component, as used herein, may include hardware, such as a processor, an ASIC, or a FPGA, or a combination of hardware and software (e.g., a processor executing software).

It should be emphasized that the terms "comprises"/"comprising," when used in this specification, is taken to specify the presence of stated features, integers, steps or components but does not preclude the presence or addition of one or more other features, integers, steps, components or groups thereof.

Even though particular combinations of features are recited in the claims and/or disclosed in the specification, these combinations are not intended to limit the disclosure of the invention. In fact, many of these features may be combined in ways not specifically recited in the claims and/or disclosed in the specification. Although each dependent claim listed below may directly depend on only one other claim, the disclosure of the invention includes each dependent claim in combination with every other claim in the claim set.

No element, act, or instruction used in the present application should be construed as critical or essential to the invention unless explicitly described as such. Also, as used herein, the article "a" is intended to include one or more items. Where only one item is intended, the term "one" or similar language is used. Further, the phrase "based on" is intended to mean "based, at least in part, on" unless explicitly stated otherwise.

What is claimed is:

1. A method, comprising:
   receiving, by a user device, a first request to generate a pseudo device identifier, associated with the user device, where the pseudo device identifier enables the user device to communicate with a server device without using an identifier associated with the user device;
   retrieving, from a memory associated with the user device and in response to the first request, the identifier associated with the user device;
   generating, by the user device and using a mathematical function, the pseudo device identifier based on the identifier associated with the user device, where the pseudo device identifier is generated in a format corresponding to a telephone number;
   sending, by the user device and to the server device, a second request to register the user device, where the second request includes the pseudo device identifier;

receiving, by the user device and from the server device, a confirmation code that indicates that user device has been registered with the server device;

sending, by the user device and to the server device, a third request for the information associated with the server device, where the third request includes the confirmation code; and receiving, by the user device and from the server device, information associated with the server device.

2. The method of claim 1, further comprising:

sending, to another server device, a fourth request to download a mobile digital video recorder (DVR) application, where the mobile DVR application enables the user device to generate the pseudo device identifier, and to access, monitor, or control the information associated with the server device from a location that is remote from the server device;

receiving, from the other server device, the mobile DVR application; and storing the mobile DVR application in the memory associated with the user device.

3. The method of claim 2, where retrieving the identifier associated with the user device includes:

using an original equipment manufacturer (OEM) access programming interface (API), associated with the mobile DVR application, to retrieve the identifier associated with the user device from the memory.

4. The method of claim 1, where generating the pseudo device identifier further includes:

performing, using the mathematical function, an operation on the identifier associated with the user device to generate a number; and converting the generated number into the pseudo device identifier by inserting one or more digits into the generated number, where inserting the one or more digits creates the pseudo device identifier in the format that corresponds to a telephone number.

5. The method of claim 1, where the format that corresponds to a telephone number is based on a format associated with a North American Numbering Plan (NANP); and where generating the pseudo device identifier further includes:

performing, using the mathematical function, an operation on the identifier associated with the user device to generate a number that includes a quantity of digits;

converting the number into a NANP format by inserting at least one digit into a particular location within the quantity of digits; and creating the pseudo device identifier by setting the at least one digit to a value that ensures that the pseudo device identifier does not match any NANP-based telephone numbers.

6. The method of claim 5, where performing the operation on the identifier associated with the user device further includes:

determining that the quantity of digits is less than a particular length; and appending one or more digits to the quantity of digits until the quantity of digits is equal to the particular length.

7. The method of claim 1, where the mathematical function is a hash function or a cryptographic function.

8. The method of claim 1, further comprising:

sending, to another server device, the pseudo device identifier to determine whether the pseudo device identifier is unique; and receiving, from the other server device, a notification that that pseudo device identifier is unique.

9. The method of claim 1, further comprising:

storing, in the memory associated with the user device, the pseudo device identifier or the confirmation code in a manner that does not permit a user, of the user device, to access or change the pseudo device identifier or the confirmation code.

10. A user device, comprising:

a memory to store information associated with the user device; and a processor to:

receive a request to register the user device, where the registering enables information, associated with a first server device, to be accessed by the user device;

generate, in response to the request, a pseudo mobile directory number (MDN) based on the information associated with the user device, where the pseudo MDN permits the user device to be identified without using an MDN associated with the user device;

send, to a second server device, the pseudo MDN to determine whether the pseudo MDN is unique, receive, from the second server device, another pseudo MDN when the pseudo MDN is determined not to be unique, send, to the first server device, the pseudo MDN to register the user device when the pseudo MDN is determined to be unique, or send, to the first server device, the other pseudo MDN to register the user device, when the pseudo MDN is determined not to be unique, receive, from the first server device, a confirmation code confirming that the user device is registered, send, to the first server device, an instruction to send information associated with the first server device, the instruction including the confirmation code, and receive, from the first server device, the information associated with the server device.

11. The user device of claim 10, where a mobile DVR application, hosted by the user device, includes a plurality of original equipment manufacturer (OEM) application programming interfaces (APIs), where each OEM API, of the plurality of OEM APIs, corresponds to a different type or brand of user device and where the each OEM API does not permit information associated with the different type or brand of user device to be accessed or changed.

12. The user device of claim 10, where, when generating the pseudo MDN, the processor is to:

generate, using a mathematical function, a quantity of digits based on the information associated with the user device; and insert at least one digit into a particular location within the quantity of digits to create the pseudo MDN.

13. The user device of claim 12, where the mathematical function is a hash function or a cryptographic function.

14. The user device of claim 10, where the pseudo MDN or the other pseudo MDN is based on a North American Numbering Plan (NANP) telephone number format and where the pseudo MDN or the other pseudo MDN do not match any NANP-based telephone numbers.

15. The user device of claim 10, where the confirmation code is based on a North American Numbering Plan (NANP) telephone number format and where the confirmation code is generated, using a mathematical function, based on information associated with the first server device.

16. A method, comprising:

receiving, by a user device, a first request to generate a pseudo identifier associated with the user device, where the pseudo identifier enables the user device to communicate with a video client device without using an identifier associated with the user device;

generating, by the user device and using a mathematical function, the pseudo identifier based on the identifier associated with the user device;

sending, by the user device and to the video client device, a second request to register the user device, where the second request includes the pseudo identifier that corresponds to a telephone number format and does not match any existing telephone number;

receiving, by the user device and from the video client device, a confirmation code that indicates that the user device has been registered;

storing, in a memory associated the user device, the pseudo identifier or the confirmation code, where the storing is conducted in a manner that renders the pseudo identifier or the confirmation code inaccessible by a user of the user device; and sending, by the user device and at a later point in time, a third request for information associated with the video client device, where the third request include the confirmation code obtained from the memory; and receiving, by the user device and from the video client device, the information associated with the video client device.

17. The method of claim 16, further comprising:

sending, to a server device, a fourth request to download an application that includes the mathematical function which enables the user device to generate the pseudo identifier.

18. The method of claim 16, where generating the pseudo identifier includes:

generating a number using the mathematical function, where the number is based on the identifier associated with the user device; and converting the generated number into the pseudo identifier by inserting one or more digits into the generated number, where the inserting causes the pseudo identifier to be configured in a format associated with a telephone number, and where the one or more digits are set in a manner that ensures that the pseudo identifier does not match any existing telephone numbers.

19. The method of claim 16, further comprising:

sending, to a server device, the pseudo identifier to determine whether the pseudo identifier is unique;

receiving, from the server device, a notification that that pseudo identifier is unique when the pseudo identifier does not match any of a plurality of pseudo identifiers stored in a memory associated with the server device; and receiving, from the server device, another pseudo identifier, when the pseudo identifier matches one of the plurality of pseudo identifiers stored in the memory associated with the server device.

20. The method of claim 19, where the other pseudo identifier is generated, using a hash function or cryptographic function, based on the identifier associated with the user device.

21. The method of claim 16, where receiving the confirmation code further includes:

receiving, via a user interface, the confirmation code, when a user of the user device enters the confirmation code, presented on a display associated with the video client device, into the user interface.

22. The method of claim 16, where the information associated with the video client device is digital video recorder (DVR) information that includes a television content listing and a television content recording schedule, the method further comprising:

selecting particular television content, from the television content listing, to set up a DVR recording session for the particular television content; and sending, to the video client device, selection of the particular television content and the confirmation code.

* * * * *